United States Patent [19]

Janssen et al.

[11] Patent Number: 5,480,927
[45] Date of Patent: Jan. 2, 1996

[54] METHOD OF INCREASING THE CONCENTRATION OF RADIATION-ABSORBING AGENTS IN OPTICAL AND OPHTHALMIC LENSES

[75] Inventors: Robert A. Janssen, Alpharetta; Charlotte L. Cooper, Chamblee; Deborah J. Mulcahy, Duluth; Judy L. Peeples, Atlanta; Leslie F. Stebbins, Roswell, all of Ga.

[73] Assignee: Ciba Geigy Corporation, Tarrytown, N.Y.

[21] Appl. No.: 246,654

[22] Filed: May 20, 1994

[51] Int. Cl.$^6$ .......................... C08K 5/3412; D06P 5/00
[52] U.S. Cl. .......................... 524/100; 524/417; 523/106; 8/507; 8/549
[58] Field of Search ...................... 524/100, 417; 523/106; 8/507, 549

[56] References Cited

U.S. PATENT DOCUMENTS

| | | | |
|---|---|---|---|
| Re. 27,401 | 6/1972 | Wichterle | 260/2.5 |
| 2,976,576 | 3/1961 | Wichterle | 18/58 |
| 3,041,330 | 6/1962 | Coleman | 260/231 |
| 3,159,646 | 12/1964 | Millionis | 360/308 |
| 3,213,058 | 10/1965 | Boyle | 260/47 |
| 3,214,436 | 10/1965 | Boyle | 260/308 |
| 3,399,173 | 8/1968 | Heller | 260/47 |
| 3,493,539 | 2/1970 | Skoultchl | 260/47 |
| 4,157,892 | 6/1979 | Tanaka et al. | 8/14 |
| 4,390,676 | 6/1983 | Loshaek | 526/313 |
| 4,418,000 | 11/1983 | Zannucci | 252/403 |
| 4,418,002 | 11/1983 | Zannucci | 252/403 |
| 4,528,311 | 7/1985 | Beard | 524/91 |
| 4,553,975 | 11/1985 | Su | 8/507 |
| 4,559,059 | 12/1985 | Su | 9/507 |
| 4,636,212 | 1/1987 | Posin | 623/6 |
| 4,753,654 | 6/1988 | Posin | 623/6 |
| 4,795,461 | 1/1989 | Lindqvist | 623/6 |
| 4,826,928 | 5/1989 | Migdal | 544/216 |
| 4,880,859 | 11/1989 | Slongo | 524/91 |
| 4,891,046 | 1/1990 | Wittmann | 8/507 |
| 4,929,250 | 5/1990 | Hung | 8/507 |
| 4,963,160 | 10/1990 | Hung | 8/507 |
| 5,098,445 | 3/1992 | Hung | 8/507 |
| 5,147,902 | 9/1992 | Ichikawa | 523/106 |
| 5,252,628 | 10/1993 | Chirila | 523/106 |

FOREIGN PATENT DOCUMENTS 472496  2/1992  European Pat. Off. ........ B29D 11/00

Primary Examiner—Kriellion S. Morgan
Attorney, Agent, or Firm—Edward McC. Roberts; R. Scott Meece

[57] ABSTRACT

A method and composition useful in fabricating radiation-absorbing contact lenses, especially ultraviolet (UV) and visible (tint) light-absorbing lenses. The radiation-absorber is incorporated into a contact lens in the presence of a buffer which maintains the pH near neutral. Subsequently, the radiation-absorber is chemically affixed to the lens by raising the pH to a highly basic level.

24 Claims, 1 Drawing Sheet

METHOD OF INCREASING THE CONCENTRATION OF RADIATION-ABSORBING AGENTS IN OPTICAL AND OPHTHALMIC LENSES

BACKGROUND OF THE INVENTION

1. Field of the Invention

This invention relates broadly to optical and ophthalmic technology. More specifically, this invention relates to contact lenses having radiation absorption materials, especially visible and ultraviolet light absorbing materials.

2. Description of the Related Art

Ultraviolet radiation, i.e., radiation having wavelengths of about 200 to 400 nm, is known to be harmful to human beings in various ways. For example, several ocular pathologies have been found to result from excessive exposure to ultraviolet radiation. Further, ocular damage resulting from ultraviolet radiation is known to be cumulative. Thus, the importance of providing adequate protection of the eye from harmful ultraviolet radiation should not be underestimated.

Ultraviolet radiation absorbing coatings on spectacles and within sunglasses are well known in the art. More recently, ultraviolet radiation absorbing contact lenses and methods of fabricating these lenses have been disclosed. For example, U.S. Pat. No. 4,390,676 discloses an ultraviolet radiation-absorbing contact lens formed by copolymerizing a monomer suitable for making lenses and a compound useful in absorbing radiation having wavelengths of 340 to 450 nm. The UV absorbing compound, 2-hydroxy-4-methacryloxy-benzophenone, is incorporated into the lens' polymeric material at the molecular level. Another example of a disclosure of UV-absorbing contact lenses is U.S. Pat. No. 4,528,311. This patent discloses ultraviolet light absorbing contact lenses made of a polymeric composition comprising copolymers of 2-hydroxy-5-acrylyloxyphenyl-2H-benzotriazole with one or more other monomers copolymerizable therewith.

An example of a fundamental improvement in aforementioned UV-absorber technology is U.S. Pat. No. 4,929,250, issued to Hung, et al., which discloses a halotriazine reactive ultraviolet radiation absorbing agent employed in relatively small amounts to produce a lens having little yellowing. The agent includes a UV-absorbing component and an aqueous soluble moiety bonded to a halotriazine. Although the Hung patent discloses substantial improvements in contact lens UV-absorption technology, there is a need to increase the efficiency of incorporating UV absorbers in contact lenses.

SUMMARY OF THE INVENTION

An object of the invention is to increase the efficiency of incorporating radiation absorption material into a hydrophilic polymeric material suitable for formation of contact lenses.

Another object of the invention is to provide a method of fabricating a contact lens having reduced visible or ultraviolet light transmission therethrough.

A further object of the invention is to reduce the process steps required to incorporate a radiation-absorbing component into an optical or ophthalmic lens.

Yet another object of the invention is to improve the precision and accuracy of the radiation-absorbing characteristics of an optical or ophthalmic lens.

Still another objection of the invention is to reduce the cycle time required to fabricate a radiation-absorbing contact lens.

A further object of the invention is to eliminate the adverse affects of chemical neutralizers required in processes which incorporate radiation-absorbing materials into contact lens.

One embodiment of the present invention is a method useful in fabricating an ultraviolet (UV) light-absorbing or tinted contact lenses. A UV absorber or tint compound is incorporated into a contact lens during a process in which the pH is maintain near neutral. Preferably, a buffering agent is added to the UV absorber or tint compound to buffer the pH to about 6 to 8. The lens is contacted with the buffered composition for a time sufficient to enable the UV absorber or tint compound to thoroughly diffuse through the polymer matrix. Subsequently, the UV absorber or tint compound is chemically affixed to the lens by raising the pH to a basic level.

Another embodiment of the present invention is a composition useful in efficiently incorporating UV absorbing or tint components into contact lenses. The composition includes a UV absorber or tint compound and a buffer capable of maintaining the pH between about 6 and 8 over a predetermined period of about 5 to 60 minutes. The UV absorber or tint compound is preferably selected from a group of reactive halotriazines having UV absorptive moieties or dye groups attached thereto.

DESCRIPTION OF THE PREFERRED EMBODIMENTS

Figure 1:
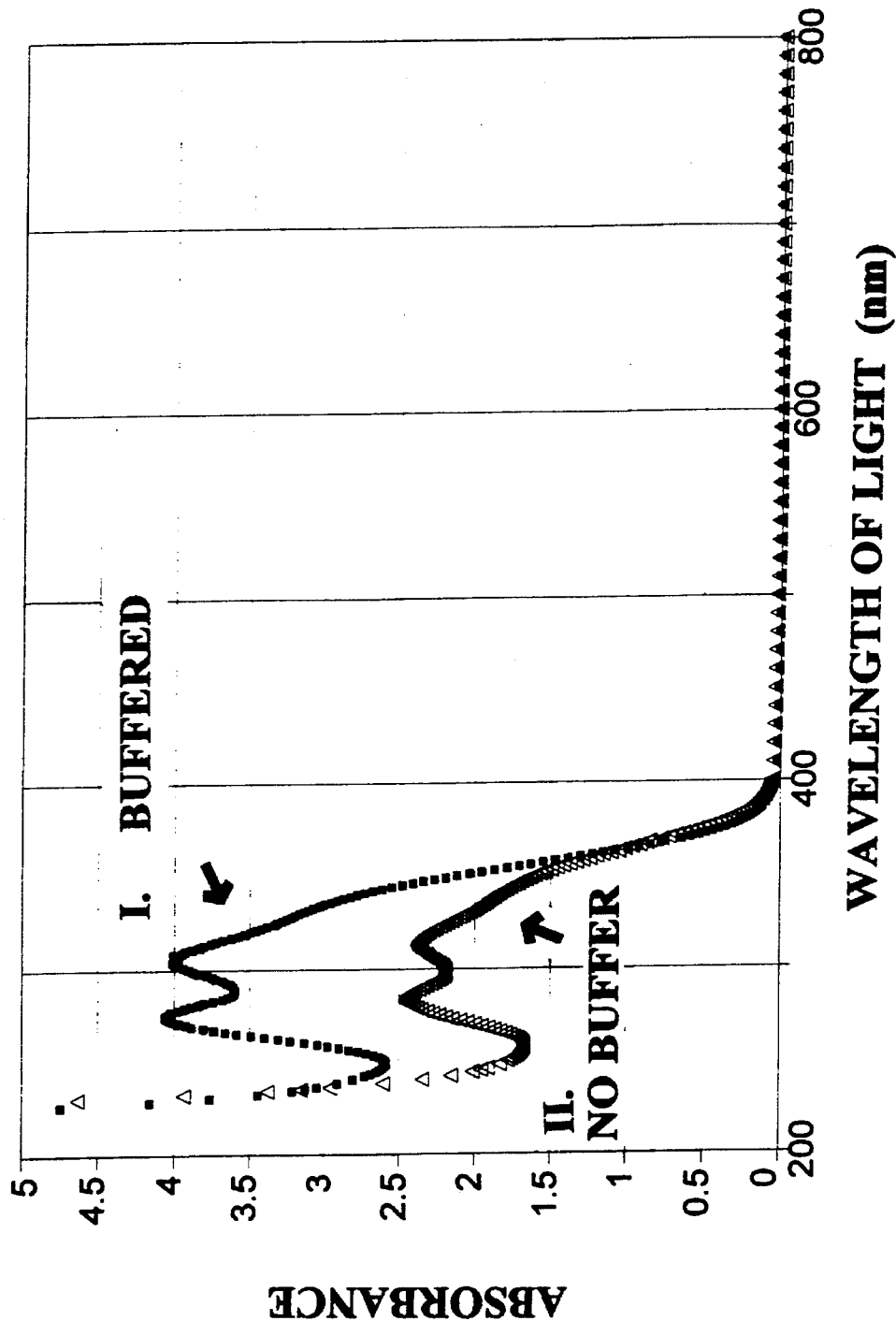
FIG. 1 is a graph of absorbance v. wavelength of light (nm) comparing lenses produced by buffered and unbuffered processes.

While the present invention has utility in the formation of a wide variety of lenses, including for example, intraocular lenses, the invention will be described with respect to contact lenses, as this is the preferred embodiment. The invention has particular utility in the fabrication of UV-absorbing hydrophilic (i.e., soft) contact lenses. In addition, the invention has utility in the fabrication of tinted contact lenses. Although the description focuses primarily on UV-absorbing agents, dye-containing halotriazine compounds (tinting agents) may be substituted therefor or included therewith as additional components.

The present invention has utility in improving the efficiency of incorporation of a UV absorbing agent or tint agent into contact lenses. The preferred UV absorbing agents are defined by the following formula:

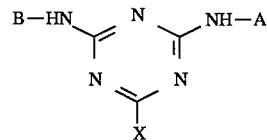

where
X=Cl or F;
A=an ultraviolet radiation absorbing radical as defined below; and B=an aqueous soluble moiety or an ultraviolet radiation absorbing radical as defined below.

A preferred group of UV absorbing agents includes the chlorotriazine bases, i.e., where X=Cl.

The UV absorbing agent is preferably water soluble. Water soluble agents are especially preferred in processes in which the UV absorbing agent is incorporated into the lens in an aqueous solution.

The ultraviolet radiation absorbing radical (A and, in some cases, B) of the UV absorbing agent of the present invention may be chosen from a variety of compositions. Representative of such UV-absorbing materials are those disclosed in U.S. Pat. Nos. 3,041,330, 3,159,646, 3,213,058, 3,214,436, 3,399,173, 3,493,539, 4,418,000, 4,418,002, 4,826,978, 4,880,859, 4,929,250, 4,963,160 and 5,098,445, all of which are incorporated herein by reference. Thus, UV absorbing radicals useful in accordance with the present invention include benzoic acid esters, cyano and carbomethoxy acrylates, oxalic acid diamides, and hydroxyphenyltriazines.

The ultraviolet radiation absorbing radical is preferably selected from the group including the following:

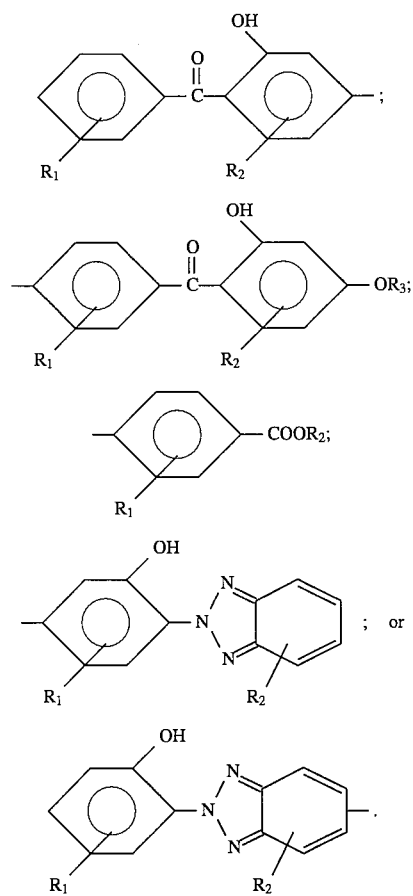

If an aqueous soluble moiety is used (i.e., group B), the preferred group of aqueous soluble moieties are defined by the formula

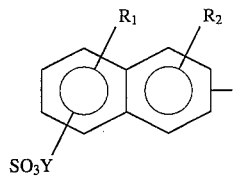

where Y is an amine salt or an alkali salt; $R_1$ and $R_2$ are selected from the group consisting of hydrogen, alkyl chains varying from $C_1$ to $C_{18}$, alkoxy, halogen, nitro, hydroxy, carboxy, sulfonic acid, or sulfonic acid salt substituents.

A particularly preferred UV absorbing agent is 2-methoxy-4-hydroxy- 5-[4-(2-(4-chloro-6-(4-carboxy-3-hydroxyphenylamino)triazinyl)amino)phenylcarbonyl] benzenesulfonic acid sodium salt ($C_{24}H_{17}N_5O_9ClNa$). This agent has the following chemical structure:

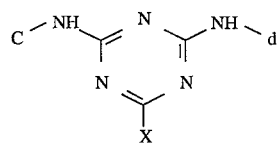

where C is defined by the structure

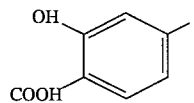

and where d is defined by the structure

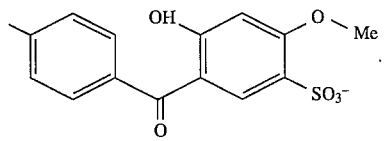

The tinting or dye compounds, i.e., visible light-absorbing compounds, useful in accordance with the present invention have the following formula

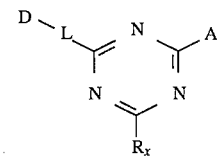

wherein D is an organic dyestuff radical, L is a bond or a divalent linking group, A is a halo, and $R_x$ is an optional substituent. Preferably, A is fluoro or chloro, more preferably fluoro.

D is the radical of an organic dyestuff radical, including without limitation thereto, dyes described in the Color Index, Volume 5, Third Edition (Second Revision, 1982) and dyes described in U.S. Pat. No. 4,559,059, both of which are hereby incorporated by reference. The radical D may advantageously be the radical of an azo, phthalocyanine, azomethine, nitro, or anthraquinone dye.

Certain reactive dye-containing halotriazine compounds useful in accordance with the present invention are described more fully in U.S. Pat. No. 4,559,059 issued to Su, which is incorporated herein by reference.

The process of incorporating the aforementioned UV absorbing agents and/or tinting compounds into the polymeric matrix of a contact lens has been advantageously improved by use of a buffering means in accordance with the present invention. Broadly, the process involves contacting the lens material with the UV absorbing agent, buffering the lens material and agent at a pH nearly neutral, and allowing the UV absorbing agent to contact the lens in the buffered state for a time sufficient to allow diffusion of the UV absorbing agent into the polymer matrix of the lens. Subsequent to this process, the UV absorbing material is affixed to the lens polymer matrix by increasing the pH to an appropriately basic level.

Although the UV absorbing agent will bond to the lens polymer in basic solutions, the UV absorbing agent is also chemically deactivated in basic solutions. If the agent is not sufficiently close to the polymer matrix when the pH becomes basic, reactive groups on the agent become deactivated, thereby prohibiting subsequent bonding to the lens. However, advantageously according to the present invention, buffering allows the UV absorbing agent to thoroughly diffuse into the polymer matrix. Subsequently, increasing the pH allows the agent within the matrix to bond, resulting in a high concentration of UV absorbing agent finally dispersed throughout, and bound to sites on, the lens matrix. Hence, the buffering process of the present invention improves the efficiency of incorporating UV agents into contact lenses.

The buffer should maintain the pH between about 5 to about 9, more preferably about 6 to about 8. The most preferred pH is about 6.5 to about 7.5. As previously mentioned, high pH causes the UV absorbing agent to react, either binding to the lens or, if the reaction is premature, deactivating the UV absorbing agent. Excessively low pH levels are preferably avoided because acidic pH solutions may generate other processing problems, such as corroding equipment and requiring the excessive alkaline additives during the agent affixation step.

The buffering component may be chosen from a wide variety of buffers which are compatible with the hydrophilic contact lens polymer material. Useful buffers include, without limitation thereto, sodium dihydrogen phosphate and disodium hydrogen phosphate. A preferred buffer is a combination of sodium dihydrogen phosphate and disodium hydrogen phosphate, preferably having a weight ratio of about 10:1 to about 1:1 sodium dihydrogen phosphate:disodium hydrogen phosphate, more preferably about 7:1 to about 3:1. A preferred buffer solution may be formed by placing about 3 to 7 grams of dibasic sodium phosphate heptahydrate and about 0.5 to about 1.5 grams of monobasic sodium phosphate monohydrate in about a liter of water. Thus, a preferred buffer composition includes about 0.3 to about 0.7 weight percent dibasic sodium phosphate heptahydrate, about 0.05 to about 0.15 weight percent monobasic sodium phosphate monohydrate, and the balance water.

The UV-absorber/buffer solution is formed by dissolving the UV-absorbing agent and the buffering component in water. The UV-absorbing agent may be present at a concentration of about 0.1 to about 2 weight percent, based on the total solution weight. Preferably, the concentration of UV-absorbing agent is about 0.1 to about 1.0, more preferably about 0.25 to about 0.75 weight percent. The buffered UV-absorber solution may be formed by addition of the UV-absorber in the aforementioned concentrations to the previously-described buffer solution.

The buffered UV-absorber solution is contacted with the lens material under conditions which optimize UV absorber diffusion into the lens matrix without causing damage thereto. The contact time will depend somewhat on processing conditions and specific compositions used. Preferably, the buffered UV absorber composition is contacted with the lens material for about 5 to about 60 minutes, more preferably about 10 to about 20 minutes. The buffered UV absorber solution/lens contacting process is preferably accomplished at about 20° C. to about 40° C. for a period of about 5 to 30 minutes, more preferably at about 25° C. to about 35° C. for a period of about 10 to 20 minutes. While diffusion is advantageously increased at higher temperatures, excessively high temperatures may damage the lens material.

Subsequent to the diffusion of the UV-absorber into the lens polymeric matrix, the absorber is chemically bonded or affixed to the lens. The absorber bonding is preferably initiated by increasing the pH to a basic level adequate to activate the reactive sites on the U V-absorber agent. For the preferred reactive halotriazine UV-absorbing agents, the pH is raised to about 12 to about 14, more preferably about 12.5 to about 13.5, for a period of about 1 to about 30 minutes, more preferably about 10 to 20 minutes. Temperatures during basic activation of the UV-absorber are preferably held at about 25° to 75° C., more preferably about 30° to 50° C.

The pH may be increased by addition of a variety of basic activator compounds, including without limitation thereto, sodium hydroxide, sodium bicarbonate, potassium bicarbonate, sodium phosphate, potassium phosphate, tribasic sodium phosphate dodecahydrate, mixtures thereof, and the like. A preferred basic activator solution includes 5 to 15 (more preferably about 8 to 12) weight percent tribasic sodium phosphate dodecahydrate, 1 to 5 (preferably about 1 to 3) weight percent tetrabutyl ammonium bromide, and the balance water.

The polymeric lens materials useful in accordance with the present invention may vary widely, as long as the polymer has the required functional groups to bond with the UV-absorbing agent. Examples of such functional groups include hydroxyl, amino, amide and mercapto groups. Suitable monomers include hydroxyalkyl esters of polymerizable unsaturated acids, such as acrylic, methacrylic, fumaric and maleic acids. In addition to hydroxyalkyl esters of unsaturated acids, the following monomeric materials may serve as typical examples of comonomers which can be used in conjunction with monomers providing the required functional groups: acrylic and methacrylic acids; alkyl and cycloalkyl acrylates and methacrylates; N-(1,1-dimethyl-3-oxobutyl) acrylamide and heterocyclic N-vinyl compounds containing a carbonyl functionality adjacent to the nitrogen in the ring, such as N-vinyl pyrrolidone. A cross-linking agent, such as ethylene glycol dimethacrylate or diethylene glycol bis-allyl carbonate, may be used to provide the polymeric material. A preferred lens monomer for forming a hydrophilic contact lens is hydroxyethyl methacrylate (HEMA), as disclosed in U.S. Pat. No. 2,976,576 and U.S. Re. Pat. No. 27401, which are incorporated herein by reference. An example of a "hard" contact lens material having an acceptable functional group is cellulose acetate butyrate.

The previous disclosure will enable one having ordinary skill in the art to practice the invention without undue experimentation. However, in order to better enable the reader to understand specific embodiments and the advantages thereof, reference to the following examples is suggested.

EXAMPLE I

A UV absorber, (having the stoichiometric formula $C_{24}H_{17}N_5O_9ClNa$), produced by the process described in U.S. Pat. No. 4,963,160, is incorporated into the polymer matrix of a vifilcon lens via the following process. A buffer solution is prepared by mixing about 4.76 grams of (dibasic) disodium hydrogen phosphate (available from Aldrich Chemical Company, located in Milwaukee, Wis.) with about 0.77 grams of (monobasic) sodium dihydrogen phosphate (available from Aldrich) in about 1000 grams deionized water. A buffered UV absorber solution is formed by mixing about 5.0 grams of the aforementioned UV-absorbing agent with the aforementioned buffer solution.

A NEW VUES® contact lens (available from CIBA Vision Corporation, Duluth, Ga.) is placed in about one liter of the buffered UV absorber solution. The lens is allowed to remain in the solution at a temperature of about 30° C. for a contact time of about 20 minutes.

The UV absorber is bonded to the lens by increasing the pH with a basic activator solution. The basic activator solution is prepared by mixing 200 grams sodium phosphate tribasic (Aldrich) and about 40 grams tetrabuylammonium bromide (Aldrich) in about 2000 grams deionized water. The contact lens is subsequently placed in about one liter of the basic activator solution. The lens is allowed to remain in the solution at a temperature of about 40° C. for a contact time of about 15 minutes.

The absorbance of the lenses is measured with a CARY 3 spectrophotometer, available from Varian. The absorbance is measured over the wavelengths ranging from 800 to 200 nm, thereby including the ultraviolet range of 200 to 400 nm. The results for each lens are shown graphically in FIG. 1 and are labeled as curve I.

COMPARATIVE EXAMPLE II

In this Example, the procedures and components used to incorporate a UV absorber into a contact lens are the same as described in Example I, with the exception being that no buffer is incorporated into the UV-absorber solution.

As in Example I, the absorbance of the lenses is measured with a Varian Cary 3 spectrophotometer over the wavelengths ranging from 800 to 200 nm. The results are shown graphically in FIG. 1 as curve II.

A comparison of the results of experiments performed substantially in conformance with the procedures recited in Example I and Comparative Example II indicates that the lenses from the Example I procedure yielded an absorbance about double that yielded by the lenses of Comparative Example II. The difference between the examples was that Comparative Example II used a chemical neutralizer, while Example I employed a buffer. Thus, the buffering process of the present invention advantageously and unexpectedly increases the efficiency of incorporating UV absorber into a contact lens.

The invention has been described in detail, with reference to certain preferred embodiments, in order to enable the reader to practice the invention without undue experimentation. However, a person having ordinary skill in the art will readily recognize that many of the previous components and parameters may be varied or modified to a certain extent without departing from the scope and spirit of the invention. Furthermore, titles, headings, or the like are provided to enhance the reader's comprehension of this document, and should not be read as limiting the scope of the present invention. Accordingly, the intellectual property rights to this invention are defined only by the following claims.

That which is claimed is:

1. A method of incorporating a radiation-absorbing additive into an optical or ophthalmic lens, comprising the steps of:
   (a) forming a solution containing a radiation-absorbing additive;
   (b) buffering said solution to a pH of about 6 to about 8;
   (c) applying said buffered solution to said lens at sufficient conditions and for a sufficient time to incorporate said additive into said lens in an amount sufficient to reduce radiation transmission through said lens; and
   (d) raising said solution pH to a sufficient basic level for a sufficient time to affix said additive to said lens.

2. A method as recited in claim 1, wherein said radiation-absorbing additive is an ultraviolet (UV) light-absorbing additive selected from the compounds defined by the following formula:

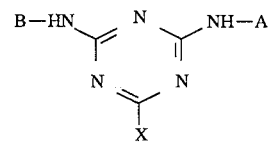

where

X=Cl or F;

A=an ultraviolet radiation absorbing radical; and

B=an aqueous soluble moiety or an ultraviolet radiation absorbing radical.

3. A method as recited in claim 2, wherein said UV-absorbing radical is selected from the group consisting of:

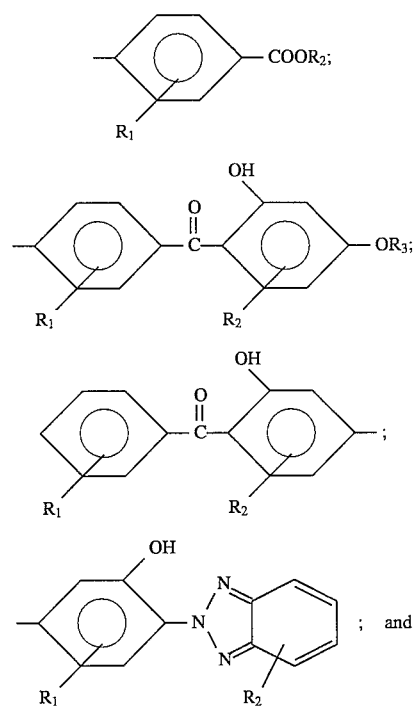

-continued

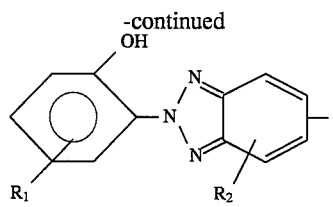

4. A method as recited in claim 3, wherein said aqueous soluble moiety is defined by the formula:

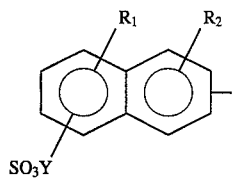

where

Y is an amine salt or an alkali salt; and $R_1$ and $R_2$ are selected from the group consisting of hydrogen, alkyl chains varying from $C_1$ to $C_{18}$, alkoxy, halogen, nitro, hydroxy, carboxy, sulfonic acid, and sulfonic acid salt substituents.

5. A method as recited in claim 1, wherein said buffer is selected from the group consisting of sodium dihydrogen phosphate and disodium hydrogen phosphate.

6. A method as recited in claim 5, wherein said buffer is an aqueous solution including sodium dihydrogen phosphate and disodium hydrogen phosphate in a weight ratio of about 10:1 to about 1:1 sodium dihydrogen phosphate:disodium hydrogen phosphate.

7. A method as recited in claim 5, wherein said buffer is an aqueous solution comprising:

(a) about 0.3 to about 0.7 weight percent dibasic sodium phosphate heptahydrate;

(b) about 0.05 to about 0.15 weight percent monobasic sodium phosphate monohydrate; and (c) the balance water.

8. A method as recited in claim 1, wherein said lens is contacted with said buffered solution at a temperature of about 20° C. to about 40° C.

9. A method as recited in claim 1, wherein said buffered solution pH ranges from about 6.5 to about 7.5.

10. A method as recited in claim 1, wherein said buffered solution is applied to said lens for a contact period of about 5 to 30 minutes.

11. A method as recited in claim 1, wherein said solution is buffered to a pH of about 6.5 to about 7.5, and said solution is contacted with said lens at a temperature of about 25° C. to about 35° C. for a contact period of about 5 to 30 minutes.

12. A method as recited in claim 1, wherein said basic pH level for affixing said additive to said lens is a pH of about 12.5 to about 13.5.

13. A method as recited in claim 1, wherein said additive is present in amounts of about 0.1 to about 2.0 weight percent in said buffered solution.

14. A method as recited in claim 1, wherein said radiation-absorbing additive is a visible light-absorbing additive defined by the formula:

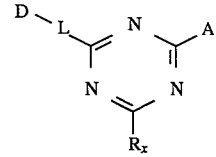

wherein

D is an organic dyestuff radical;

L is a bond or a divalent linking group;

A is a halo; and $R_x$ is an optional substituent.

15. A composition useful in fabricating an optical or ophthalmic lenses having reduced ultraviolet or visible light transmission, comprising:

(a) a radiation absorbing material; and (b) a buffer in a concentration sufficient to maintaining said composition at a pH of about 6 to about 8; and (c) a solvent in an amount sufficient to place said UV-absorbing material and said buffer in solution.

16. A composition as recited in claim 15, wherein said radiation-absorbing material is an ultraviolet radiation-absorbing material selected from the compounds defined by the following formula:

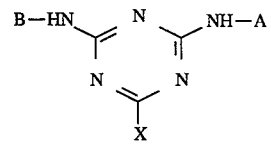

where

X=Cl or F;

A=an ultraviolet radiation absorbing radical; and

B=an aqueous soluble moiety or an ultraviolet radiation absorbing radical.

17. A composition as recited in claim 16, wherein said ultraviolet radiation-absorbing radical is selected from the group consisting of:

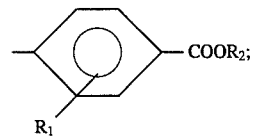

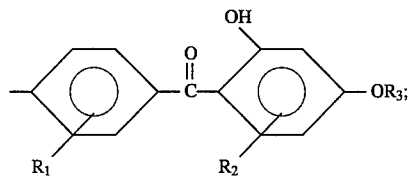

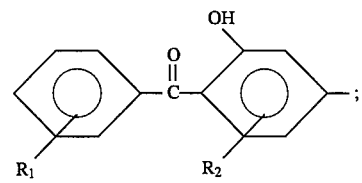

-continued

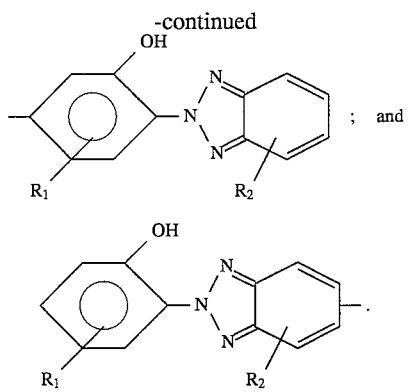
; and

18. A composition as recited in claim 16, wherein said aqueous soluble moiety is

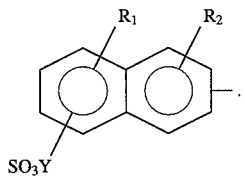

19. A composition as recited in claim 15, wherein said buffer is selected from the group consisting of sodium dihydrogen phosphate and disodium hydrogen phosphate.

20. A composition as recited in claim 19, wherein said buffer is an aqueous solution including sodium dihydrogen phosphate and disodium hydrogen phosphate in a weight ratio of about 10:1 to about 1:1 sodium dihydrogen phosphate:disodium hydrogen phosphate.

21. A composition as recited in claim 19, wherein said buffer is an aqueous solution comprising:
   (a) about 0.3 to about 0.7 weight percent dibasic sodium phosphate heptahydrate;
   (b) about 0.05 to about 0.15 weight percent monobasic sodium phosphate monohydrate; and
   (c) the balance water.

22. A composition as recited in claim 15, wherein said radiation-absorbing additive is a visible light-absorbing additive defined by the formula:

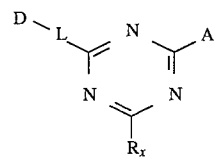

wherein

D is an organic dyestuff radical;

L is a bond or a divalent linking group;

A is a halo; and $R_x$ is an optional substituent.

23. An optical lens obtained by a method of claim 1.

24. A contact lens obtained by a method of claim 1.

* * * * *